US010254378B1

(12) United States Patent
Dang et al.

(10) Patent No.: US 10,254,378 B1
(45) Date of Patent: Apr. 9, 2019

(54) MOBILE DEVICE LOCALIZATION BASED ON RELATIVE RECEIVED SIGNAL STRENGTH INDICATORS

(71) Applicant: PHUNWARE, INC., Austin, TX (US)

(72) Inventors: Luan Dang, Newport Beach, CA (US); Matt Lindenberger, Cedar Park, TX (US); Devin Pigera, Diamond Bar, CA (US); Duy Nguyen, Huntington Beach, CA (US); Dennis Griesser, Buena Park, CA (US); Kent Tu, Orange, CA (US); Tyler Prevost, Santa Ana, CA (US)

(73) Assignee: PHUNWARE, INC., Austin, TX (US)

( * ) Notice: Subject to any disclaimer, the term of this patent is extended or adjusted under 35 U.S.C. 154(b) by 0 days.

(21) Appl. No.: 15/639,815

(22) Filed: Jun. 30, 2017

Related U.S. Application Data

(60) Provisional application No. 62/358,465, filed on Jul. 5, 2016.

(51) Int. Cl.
| G08B 1/08 | (2006.01) |
| G01S 5/02 | (2010.01) |
| H04W 4/02 | (2018.01) |
| G01C 21/20 | (2006.01) |
| G01S 5/14 | (2006.01) |
| G01C 21/16 | (2006.01) |

(52) U.S. Cl.
CPC .......... *G01S 5/0263* (2013.01); *G01C 21/165* (2013.01); *G01C 21/206* (2013.01); *G01S 5/0242* (2013.01); *G01S 5/145* (2013.01); *H04W 4/027* (2013.01)

(58) Field of Classification Search
CPC ... G01S 5/0263; G01C 21/165; G01C 21/206; G01C 5/0242; G01C 5/145; G01C 4/027; H04W 4/027
USPC ...................................................... 340/539.13
See application file for complete search history.

(56) References Cited

U.S. PATENT DOCUMENTS

| 9,426,627 | B1* | 8/2016 | Logan | H04W 4/029 |
| 9,591,603 | B2* | 3/2017 | Shaw | G01S 5/0263 |
| 9,838,993 | B2* | 12/2017 | Pandharipande | G01S 1/68 |
| 2010/0134356 | A1* | 6/2010 | Huang | G01S 5/0252 |
| | | | | 342/464 |
| 2010/0295733 | A1* | 11/2010 | Luo | G01S 5/0263 |
| | | | | 342/451 |
| 2013/0023283 | A1* | 1/2013 | Chakravarty | G01S 5/0252 |
| | | | | 455/456.1 |

(Continued)

*Primary Examiner* — Zhen Y Wu
(74) *Attorney, Agent, or Firm* — Wilson Sonsini Goodrich & Rosati

(57) ABSTRACT

The present disclosure provides methods, systems, and devices for tracking a mobile device in an indoor area or bounded area. A method for tracking a mobile device includes receiving sensor data from a mobile device and generating a heuristic map based on the sensor data describing a set of possible current locations of the mobile device in the bounded area. The method further includes receiving additional sensor data from the mobile device, and determining a change in position of the mobile device based on the additional sensor data. The method further yet includes updating the heuristic map to disqualify a first possible current location from the set of possible current locations, and outputting the updated set of possible current locations for display on a user interface.

39 Claims, 3 Drawing Sheets

(56) References Cited

U.S. PATENT DOCUMENTS

| | | | | |
|---|---|---|---|---|
| 2013/0238236 | A1* | 9/2013 | Thrun | G01C 21/206 |
| | | | | 701/418 |
| 2014/0107918 | A1* | 4/2014 | Friedler | G01O 21/20 |
| | | | | 701/445 |
| 2014/0243015 | A1* | 8/2014 | Basha | G01S 5/0226 |
| | | | | 455/456.1 |
| 2014/0351337 | A1* | 11/2014 | Pal | G09B 19/06 |
| | | | | 709/204 |
| 2015/0052460 | A1* | 2/2015 | Mohammad Mirzaei | |
| | | | | G06F 3/0484 |
| | | | | 715/764 |
| 2015/0204649 | A1* | 7/2015 | McFarthing | G01S 5/0263 |
| | | | | 702/150 |
| 2015/0281910 | A1* | 10/2015 | Choudhury | G01S 5/021 |
| | | | | 455/456.1 |
| 2016/0139242 | A1* | 5/2016 | Dupray | G01S 1/026 |
| | | | | 455/456.1 |
| 2016/0165405 | A1* | 6/2016 | Shinozuka | H04W 4/04 |
| | | | | 455/456.1 |
| 2016/0238690 | A1* | 8/2016 | Colucci | G01S 1/68 |
| 2017/0111763 | A1* | 4/2017 | Morgan | H04W 4/029 |
| 2017/0134899 | A1* | 5/2017 | Chan | H04W 64/00 |
| 2017/0347238 | A1* | 11/2017 | Menouar | H04W 4/027 |
| 2018/0070212 | A1* | 3/2018 | De Lorenzo | H04W 4/027 |

* cited by examiner

MOBILE DEVICE LOCALIZATION BASED ON RELATIVE RECEIVED SIGNAL STRENGTH INDICATORS

CROSS-REFERENCE

This application claims priority to U.S. Provisional Patent Application No. 62/358,465, filed Jul. 5, 2016, which is entirely incorporated herein by reference.

BACKGROUND

Various localization technologies have been developed or suggested for tracking mobile devices in indoor environments. However, conventional localization technologies often fall short in user experience, cost, or security. For example, although global positioning systems (GPS) may provide an acceptable user experience in outdoor environments, it is energy consuming and may suffer from frequent satellite disconnections indoors. Wi-Fi triangulation techniques have been unable to achieve accurate results with sub-second update times and thus may be unreliable for mobile devices frequently in motion. Radio-frequency identification (RFID) suffers from a relatively short communication range, a lack of extensibility, and may be world-readable introducing security concerns. Even device-centric localization techniques, for example, dead reckoning, may be prone to failure due to calibration issues and unwanted interference.

Localization techniques have also been proposed based on received signal strength indicators (RSSI). RSSI is a measurement of the strength of a received signal at the mobile device from a node such as an access point or Bluetooth low energy (BLE) beacon. In some instances, the determined power of the signal may be used to calculate a coarse-grained distance from the node. However, recent research has shown that conventional RSSI technology gives unacceptably high errors, and thus is unreliable for indoor sensor localization.

SUMMARY

Recognized herein is a need for indoor mobile device localization technology with high-accuracy, sub-second updating, and resistance to interference. At least some of these deficiencies, and others, may be addressed by various embodiments of the present invention. In particular, methods and systems provided herein may provide benefits by integrating auxiliary information to more accurately determine a location of a mobile device. By taking into account various contextual information that is provided by mobile devices and/or sensors interacting with the mobile devices, heuristic maps may be generated that provide increased information for users. The present disclosure generally relates to mobile device localization systems, methods, and devices, and more particularly relates to indoor localization of mobile devices using heuristic maps based on relative received signal strength indicators (RSSI), and includes user interfaces for presenting the same.

According to an aspect, an example method is provided for tracking a mobile device in a bounded area, for example, an indoor area such as inside a building or underground structure. The bounded area may have physical obstacles where a mobile device is unlikely to be located at or travel through. For example, a mobile device may be unlikely to be located inside a wall or other structure. A mobile device may be also unlikely to travel through a table or other furniture. The mobile device may receive physical obstacle data generated by another device in advance, or in real-time, or the mobile device may generate physical obstacle data at least partially on its own.

The method may include receiving sensor data from sensors of the mobile device. The sensors may include, for example, gyroscopes, accelerometers, magnetometers, and radios. Magnetometer or gyroscope data may be used to determine a change in orientation of the mobile device. Accelerometer data may be used to determine a displacement or change in location of the mobile device. Accelerometer data may also be used to determine if the mobile device is stationary or moving. Any combination or sequence of sensor data may be used to implement dead reckoning.

A radio sensor or antenna may be used to receive signals from nodes in a bounded area, for example, access points, or Bluetooth low energy (BLE) beacons. A received signal strength indicator (RSSI) may be determined based on the received signals. A relative comparison of RSSI between nodes or between sets of sensor data may be used instead of absolute RSSI determinations.

The method may further include generating a heuristic map based on sensor data. The heuristic map may provide one or more possible current locations of the mobile device in a bounded area. The heuristic map may provide a set, or a ranked list of possible current locations, for example, in order of likelihood or proximity. The heuristic map may be generated or updated at the mobile device. The heuristic map may also provide one or more possible next locations of the mobile device in the bounded area.

The method may still yet further include determining a change in position of the mobile device. The change in position may be determined based on any combination or sequence of sensor data described herein. For example, a presumptive change in position of the mobile device may be determined using a first set of sensor data, for example, with dead reckoning. The presumptive change in position may be revised or corrected based on a second set of sensor data, for example, based on a relative comparison of RSSI indicators.

The method may also include updating the heuristic map. Updating the heuristic map may include disqualifying a first possible current location from the set of possible current locations. The updating may be based on the determined change in position. For example, between a first possible current location and a second possible current location, a change in position may be used to disqualify the first position. The change in position may also be used to qualify a new possible current location of the mobile device. Accordingly, a third possible current location may be added to a set of possible current locations. The heuristic map may be updated with a particular periodicity, for example, every second or less. Accordingly, at least some sensor data from the mobile device may be received just as, or more often, than the frequency of updating to provide a smooth user experience.

The method may also include outputting a user interface indicating the set of current possible locations of the heuristic map. For example, a map of the current possible locations may be displayed at the mobile device. Each current possible location may be visually marked on a map of the bounded area. Other features, for example, physical obstacles and beacon nodes, may be also marked on the map of the bounded area.

According to additional aspects, an example system and an example device are provided for performing or supporting any of the aspects of the present disclosure as described hereinabove in relation to the example method.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. For example, some embodiments of the present invention are described in exemplary fashion in relation to performing localization of a mobile device by the mobile device in indoor environments. Those skilled in the art will appreciate however, that certain embodiments of the present invention may also be effective for localizing mobile devices in outdoor or partially enclosed environments; and that some or all of the localization calculations may be performed at another device or computer system remote from the mobile device.

The term "heuristic map," as used herein, generally refers to a graphical and/or vector-based representation of data or statistical results.

As described elsewhere herein, conventional indoor mobile device localization techniques suffer from various limitations. The present disclosure introduces novel systems, methods, and devices for providing robust indoor mobile device localization. With reference to the accompanying drawings, certain example embodiments of the present disclosure will now be described in detail.

Figure 1:
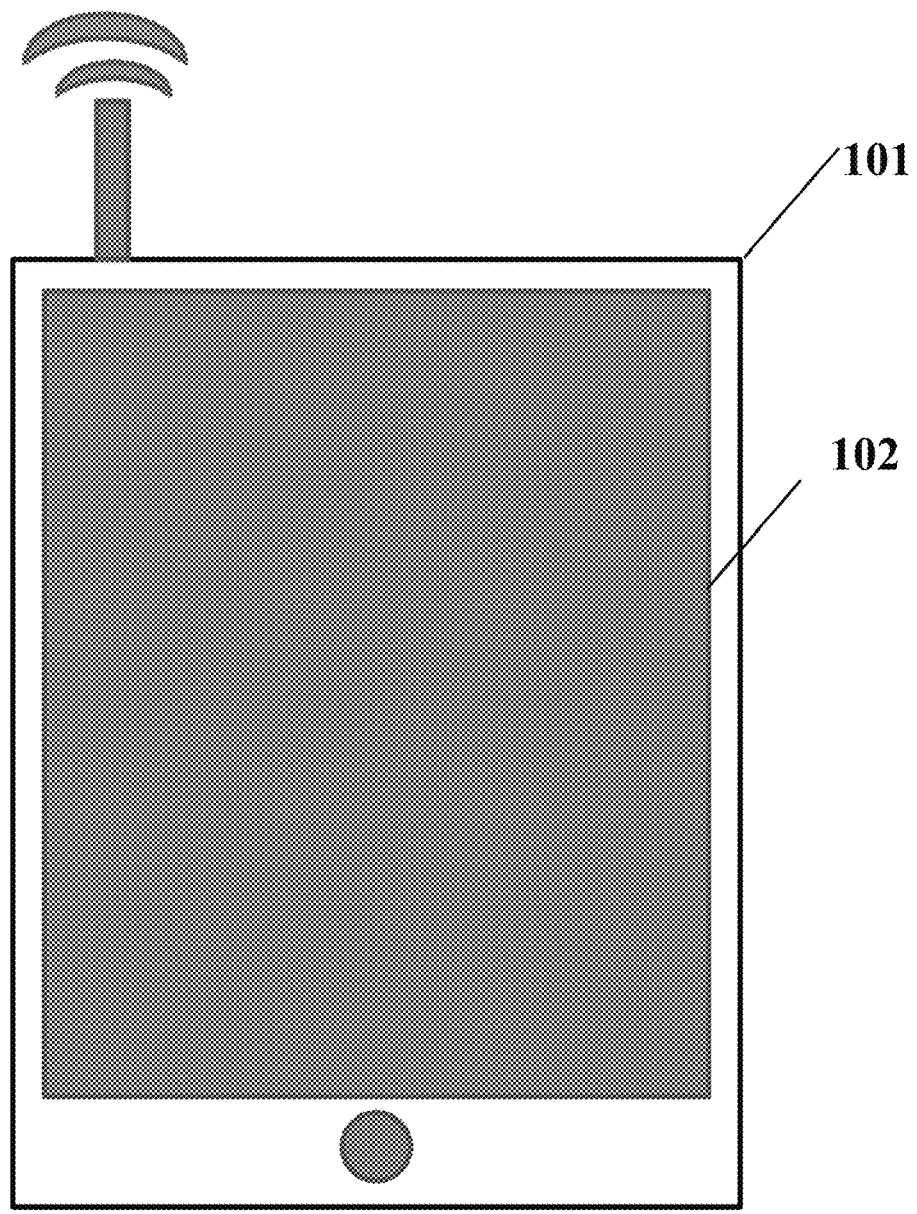
FIG. 1 shows an example mobile device 101 to be localized according to example systems and methods disclosed herein.

FIG. 1 shows an example mobile device 101 to be localized according to example systems and methods disclosed herein. The mobile device may have one or more sensors. The sensors may include one or more of a gyroscope, accelerometer, magnetometer, or various radios or antennas for receiving radio signals and other electromagnetic radiation (EMR). In example embodiments, data from combinations of these sensors may be collected and processed to determine one or more possible current locations of the mobile device.

A mobile device 101 may be, for example, one or more computing devices configured to perform one or more operations consistent with the disclosed embodiments. For example, a user device may be a computing device that is capable of executing software or applications to provide indoor localization of the mobile device. A mobile device can include, among other things, laptops or notebook computers, smart phones, cell phones, personal digital assistants (PDAs), and tablets, or wearable devices (e.g., smartwatches). A mobile device can also include any other media content player, for example, MP3 players, portable media players, gaming devices and smaller household, office and industry equipment of providing or rendering data. A mobile device may include known computing components, such as one or more processors, and one or more memory devices storing software instructions executed by the processor(s) and data.

The mobile device 101 may comprise at least a display screen 102. The display screen may use a variety of display technologies to display a heuristic map such as LCD (liquid crystal display) technology, or LPD (light emitting polymer display) technology. The mobile device 101 may further comprise a plurality of sensors and radio signal receivers for detecting and determining an indoor location of the mobile device. Details about the plurality of sensors are discussed later herein.

In an example, the mobile device may be present in a bounded area. The bounded area may be indoors, for example, inside a building or underground structure. Accordingly, satellite and other long range wireless communications may unavailable or unreliable. Moreover, the environment may present various sources of interference. For example, nearby electronic devices generating strong electromagnetic fields may throw off sensor data from magnetometers, inhibiting an accurate determination of a magnetic heading.

The bounded area may also feature one or more nodes emitting radio signals or other electromagnetic radiation. For example, a router or access point may provide a Wi-Fi or other radio signal that may be received at the mobile device. In an example, a node is a Bluetooth low energy (BLE) beacon. As discussed further herein, signals received at the mobile device from these nodes may be used by certain example embodiments to aid in localization of the mobile device.

The bounded area may also include one or more physical obstacles. These physical obstacles may include physical structures or substructures such as walls or columns, or fixtures or furniture such as tables and couches. A mobile device may be unlikely to be located at or travel through a physical obstacle. Accordingly, the locations of physical obstacles within the bounded area may be used to aid in localization of the mobile device. In particular, the locations of physical obstacles may provide additional data points in assessing the localization of the mobile device, where the additional data points may be used to increase the accuracy of mobile device localization assessment. In some example embodiments, a location of a physical object in the bounded area may be known or communicated to the mobile device over a network from another device or computer system. For instance, the mobile device may be in communication with a beacon node located in at a physical object (e.g., wall, fixtures) in a bounded area. In another example embodiment, the mobile device may generate location data for obstacles in the bounded area. This location data may be generated in real-time or at least partially in advance of a localization attempt. In some embodiments, a node or beacon may be integrated with a physical obstacle. In some cases, detection of a signal from the node or beacon may aid in detection of the physical obstacle.

According to an example embodiment, a method for tracking a mobile device in a bounded area may include receiving sensor data from the sensors of the mobile device. As mentioned above, the mobile device may comprise a plurality of sensors. The plurality of sensors may be onboard the mobile device. The plurality of sensors may include at least an inertial measurement member comprising one or more gyroscopes, velocity sensors, accelerometers, magnetometers, or one or more location sensors. The inertial sensor may be used for obtaining data indicative of a spatial disposition (e.g., position, orientation, angle) and/or motion characteristic (e.g., translational (linear) velocity, angular velocity, translational (linear) acceleration, angular acceleration) of a payload). In examples, an inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). In examples, a plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion. Various sensor data may be collected by the plurality of sensors and used to determine a change in position of the mobile device, including a change in orientation or a change in location. Some sensor data may be suited for determining changes in orientation. For example, magnetometer or gyroscope data may be used to determine whether a mobile device has turned. Accelerometer data may be suited for determining displacement, or changes in location. Some example embodiments may use combinations of these sensors to determine if the mobile device is stationary or being moved at a given moment in time. For example, magnetometer data and accelerometer data may be used to implement dead reckoning. The mobile device may be able to determine location without communicating with or receiving communication from any outside components, such as satellites or radio transponders. In examples, a location of the mobile device at a given moment may be determined based on the magnetometer or accelerometer data.

In some embodiments, sensor data collected by the inertial sensors may be corrected by a second set of sensor data. The second set of sensor data may comprise received signal strength. The second set of sensor data may provide location information based on the received signal strength. Radios or antennas of the mobile device may be used to receive radio signals from nodes or other signal sources. In some example embodiments, a received signal strength indicator (RSSI) may be determined based on the received signals. RSSI is a measurement of the strength of a received signal at the mobile device from a node such as an access point or BLE beacon. The received signals may comprise any suitable radio signals such as Wi-Fi or BLE beacon signal. RSSI measurements may fluctuate, however, due to various environmental and device specific factors, leading to inconsistent readings. Accordingly, instead of relying on an inconsistent measurement of absolute RSSI, certain example embodiments of the present disclosure may use relative RSSI measurements between nodes of the bounded area or sets of sensor data. In examples, a triangulation algorithm may be used to determine the location of the mobile device relative to the access points.

The method may also include generating a heuristic map of the bounded area or surroundings of the mobile device. The heuristic map may provide, define, or provide one or more, or all, possible current locations of the mobile device in the bounded area. In some example embodiments, the heuristic map may provide a list or set of possible current locations. In an example embodiment, the list may be ordered by confidence or determined likelihood that a mobile device is at a particular location.

A possible current location may have a confidence rating associated with it. Thus, the heuristic map may be statistical rather than absolute. In an example embodiment, when a possible current location falls below a threshold confidence rating, it is disqualified from the set of possible current locations. Similarly, a location that rises above a threshold confidence rating may qualify for the set of possible current locations. Any number of possible current locations may be provided to a user. In some cases, all, or a portion of, the qualified possible current locations may be displayed to a user on the heuristics map. In some cases, a maximum number of qualified current possible locations may be displayed. In examples, only the top three ranked possible locations are displayed. In examples, the number of possible current locations may be dynamic or may change over time. As described later herein, (qualifying) possible current locations from the set of possible current locations may be visually indicated in a user interface that is viewable at the mobile device or at a remote display device.

A confidence rating may be determined based on one or more factors. For instance, the confidence rating may be associated with the types of sensor data used for determining the location, sensor data indicating change in location or orientation, quality of sensor data (e.g., SNR), historical data, information about the environment, and/or various other factors. In some cases, the information about the environment may comprise obstacle location information. In some cases, the historical data may comprise previous location or previous possible locations of the mobile devices.

In some example embodiments, the heuristic map may also provide one or more possible next or future locations of the mobile device. One or more possible current locations may be disqualified from the future locations. For example, if a physical obstacle obstructs a location adjacent to a possible current location of the mobile device, the adjacent location may be disqualified from the set of possible next locations of the mobile device as a transition to that location from a current possible location is unlikely.

The heuristic map may be generated or updated based on sensor data, obstacle location data, a previous version of the heuristic map, or from a preprogrammed or default state. An initial heuristic map may be communicated to the mobile device from a remote source, and then maintained by the mobile device, or the mobile device may generate the initial heuristic map. In some cases, the heuristic map may comprise a floorplan or other schematic of a building overlaid by one or more possible locations of the mobile device. In some cases, the initial heuristic map may be generated based on a first set of sensor data and updated by a second set of sensor data. The first set of sensor data may or may not be the same as the second set of sensor data. For instance, the initial heuristics map comprising one or more possible current locations of the mobile device may be generated based on RSSI data and the one or more possible current locations of the mobile device may be updated (i.e., qualified or disqualified) based on inertial sensor data or RSSI data.

The method may still yet further include determining a change in position of the mobile device. The change in position may be a change in one or more of orientation or a change in location. The change in position or orientation may be used to qualify or disqualify current possible locations. For example, a rotation or turn of the mobile device without significant displacement may be enough to disqualify a possible current location of the mobile device in the bounded area, especially when the mobile devices is in communication with an asymmetric (e.g., by location or signal power) grid of nodes. Similarly, one or more possible current locations may be disqualified based on a determined displacement or change in location of the mobile device. In some cases, the change in position or orientation may be determined based on relative comparison of the received signal strength indicators or radio signals received form beacon nodes of the bounded area. In some cases, the change in position or orientation may be determined based on data from the inertial sensors such as magnetometers, accelerometers and/or gyroscope. In some cases, the change in position or orientation may be determined based on a combination of both the RSSI and the inertial sensor data.

In some example embodiments, an initial change in position may be determined with a first technique or based on a first set of sensor data, then revised based on a second technique or second set of sensor data. For example, an initial dead-reckoning estimate of a change in position may be determined based on sensor data with a relatively high sample rate, such as magnetometer and accelerometer data. Then, relative RSSI and gyroscope sensor data, which may be more resistant to electromagnetic interference, may be used to correct the dead reckoning estimate. The RSSI data and the one or more inertial sensors (e.g., accelerometers, magnetometer) may or may not have the same sampling frequency. In some cases, relative RSSI and/or gyroscope sensor data may have lower sampling frequency compared to the accelerometer or magnetometer. In some embodiments, the sensor data collected by the accelerometer is corrected by the RSSI data simultaneously. The attitude information collected by the accelerometer may be corrected at a variety of frequencies. The frequency may or may not depend on the sampling frequency of the RSSI. The correction rate may or may not be constant. For example, when the mobile device is detected to be in a high dynamic movement, the correction frequency may be high.

Various methods can be used for correcting the dead reckoning estimate. For instance, sensor fusion methods such as Kalman filter, Extended Kalman filter complimentary filter, and various other algorithms may be used to correct the dead reckoning data with the relative RSSI or gyroscope sensor data.

The method may also include updating the heuristic map. Updating the heuristic map may include disqualifying a first possible current location from the set of possible current locations. Updating the heuristic map may also include adding one or more qualified possible locations to the heuristic map. The updating may be based on the determined change in position. For example, between a first possible current location and a second possible current location, a change in position may be used to disqualify the first position. The change in position may also be used to qualify a new possible current location. Accordingly, a third possible current location may be added to or qualified for the set of possible current locations.

In some example embodiments, the heuristic map may be updated with a particular periodicity, for example, every second or less. Accordingly, sensor data from at least some sensors of the mobile device may be received just as, or more often, than the period of updating to provide a smooth user experience.

Figure 2:
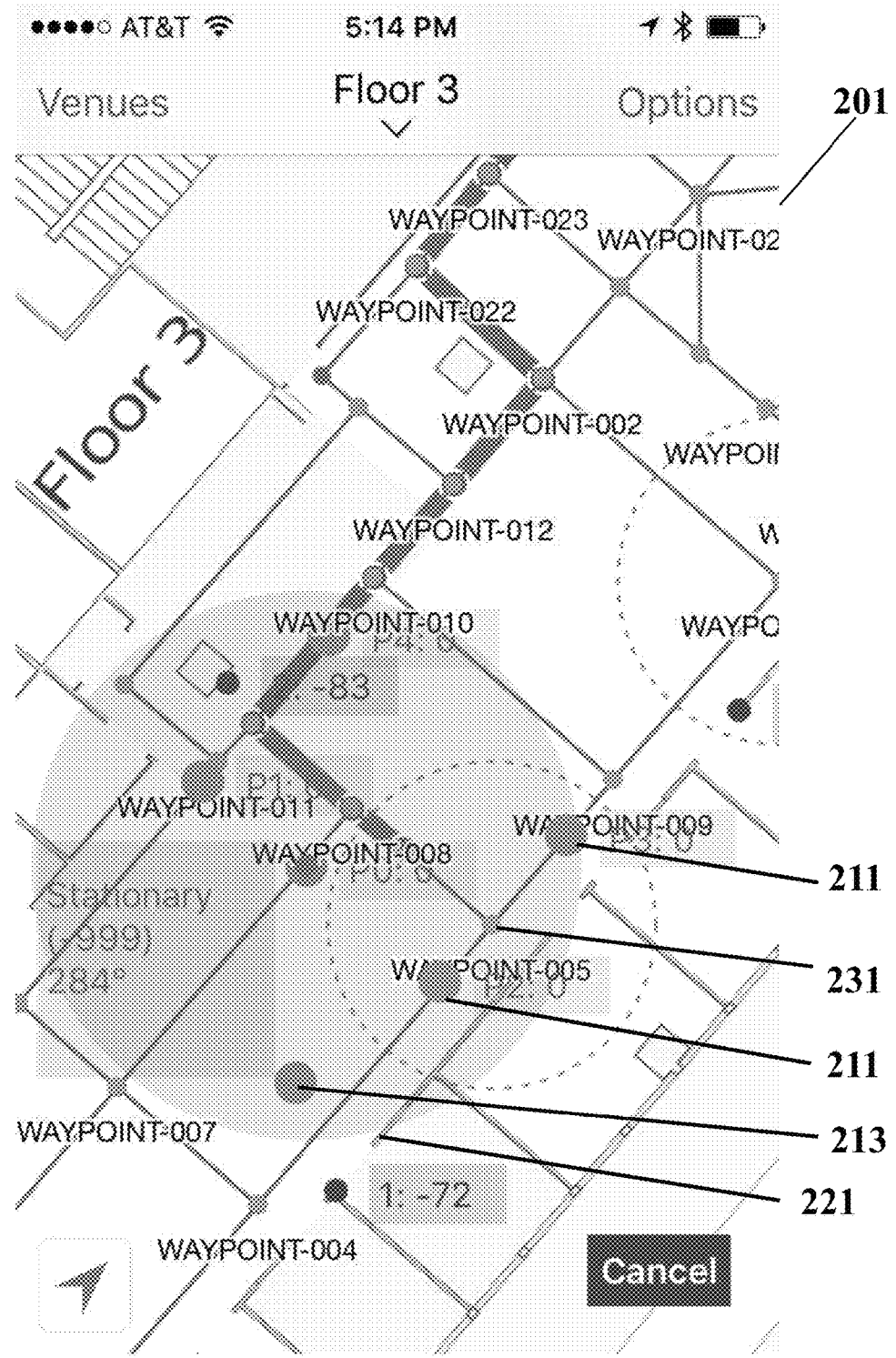
FIG. 2 shows an example user interface 201 for indicating possible current locations of the mobile device.

The method may include outputting a user interface indicating the set of current possible locations of the heuristic map. FIG. 2 shows an example user interface 201 for indicating possible current locations of the mobile device. As shown in FIG. 2, multiple possible current locations 211 may be displayed at a time. In some examples, each current possible location or a subset thereof may be visually marked on a map or other representation of the bounded area. As shown in FIG. 2, icons or other indicators of possible current locations may be overlaid on a floorplan or other schematic of a building. In some example embodiments, other features may be indicated in the user interface, for example, next possible locations 213 of the mobile device, or physical obstacles such as walls 221, or beacon nodes 231 of the bounding area. The heuristics map may comprise one or more graphical elements associated with the current possible locations. The graphical element may be overlaid onto the floorplan. The graphical element may be configured to dynamically change as a position or an orientation of the mobile device relative to bounded area changes. The graphical element may have any shapes, colors, or sizes. For example, the next possible location 213 may be denoted by a different color than the current possible location 211.

The user interface may be presented at a display of the the mobile device, or one or more remote devices. In some example embodiments, the user interface may update or refresh to reflect changes in the heuristic map with a period of or less than a second.

Computer Control Systems

Figure 3:
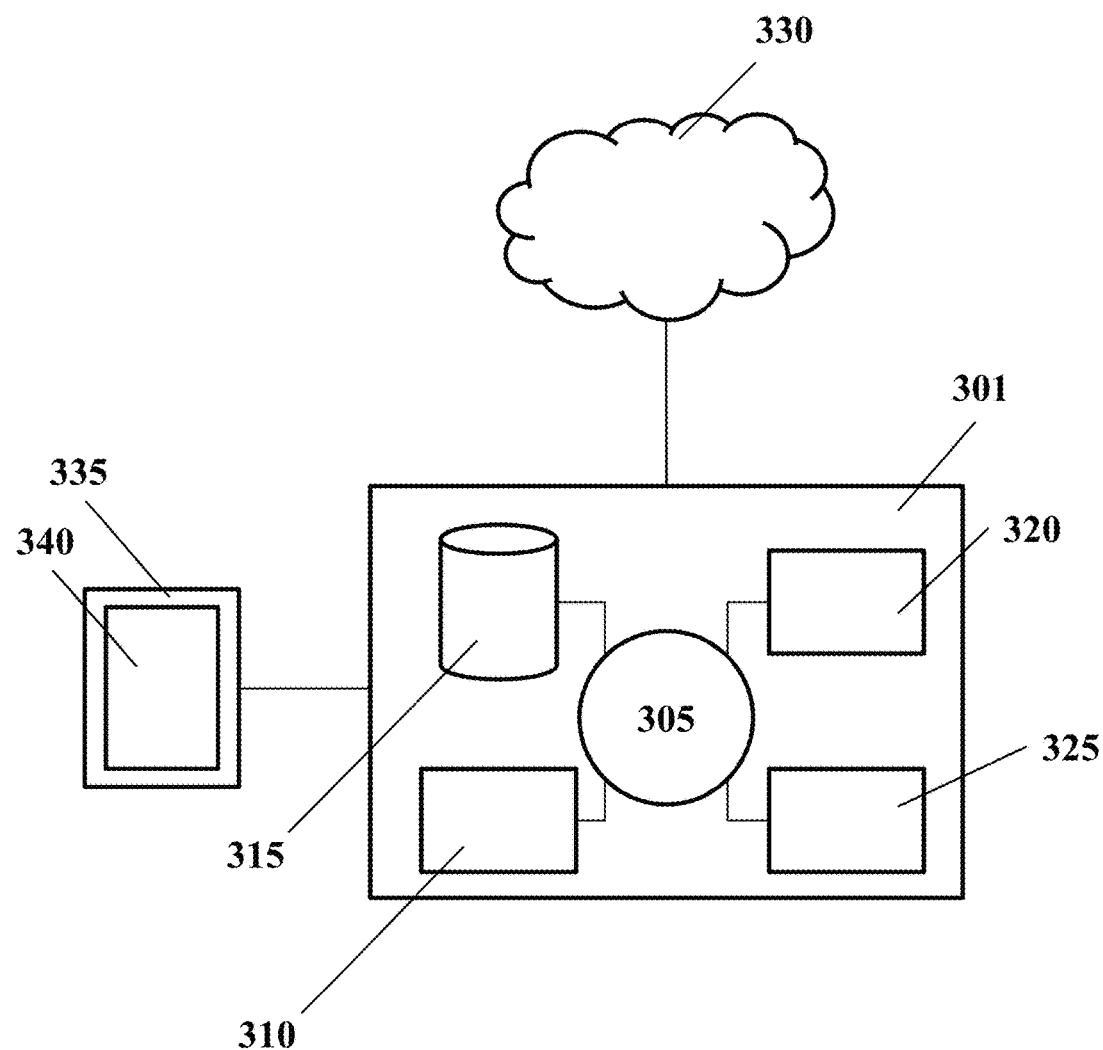
FIG. 3 shows an example computer control system 301 that is programmed or otherwise configured to implement methods provided herein.

The present disclosure provides computer control systems that are programmed to implement methods of the disclosure. FIG. 3 shows a computer system 301 that is programmed or otherwise configured to provide mobile device localization services, especially in indoor environments. The computer system 301 can regulate various aspects of the localization algorithm of the present disclosure, such as, for example, maintaining or updating the heuristic map. The computer system 301 can be, or be part of, the mobile device 101, or a device or computer system that is remotely located with respect to the mobile device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, an indication of current possible locations of the mobile device. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm can, for example, maintain or update the heuristic map based on sensor data received from the mobile device.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for tracking a mobile device in a bounded area,
the method comprising:
receiving, at a computer system, a first set of sensor data from one or more sensors of a mobile device;
at the computer system, generating, based on the first set of sensor data, a heuristic map describing a set of possible current locations of the mobile device in a bounded area;
receiving, at the computer system, a second set of sensor data from one or more sensors of the mobile device;
determining, by a computer processor at the computer system, based on the second set of sensor data, a change in position of the mobile device;
at the computer system, updating, based on the change in position, the heuristic map to disqualify a first possible current location from the set of possible current locations; and
outputting the set of current possible locations of the heuristic map for display on a user interface of the mobile device,
wherein the one or more sensors of the mobile device include a radio antenna, and wherein the determining of the change in position is further based on radio signals received at the radio antenna,
further comprising, at the computer system, determining received signal strength indicators of the radio signals, and
wherein the determining of the change in position is further based on a relative comparison of the received signal strength indicators.

2. The method of claim 1, wherein the updating of the heuristic map further comprises updating, based on the change in position, the heuristic map to qualify a second possible current location for the set of possible current locations.

3. The method of claim 1, wherein the bounded area comprises one or more physical obstacles, and wherein the updating of the heuristic map to disqualify the first possible current location is further based on a location of a physical obstacle of the bounded area.

4. The method of claim 3, further comprising receiving location data for the one or more physical obstacles.

5. The method of claim 3, wherein the one or more physical obstacles is one or more of a physical structure or furniture.

6. The method of claim 1, wherein the one or more sensors of the mobile device include an accelerometer and/or gyroscope, and wherein the determining of the change in position comprises determining a change in orientation of the mobile device based on data from the accelerometer and/or gyroscope.

7. The method of claim 6, further comprising determining, based on the data from the accelerometer, whether the mobile device is stationary or transitory.

8. The method of claim 1, wherein the heuristic map further provides a set of possible next locations of the mobile device in the bounded area.

9. The method of claim 1, wherein the radio signals are received from beacon nodes of the bounded area.

10. The method of claim 1, wherein determining the change in position of the mobile device comprises:
determining, based on dead reckoning, a possible change in position of the mobile device; and
revising, based on a relative comparison of received signal strength indicators at the mobile device, the possible change in position of the mobile device.

11. The method of claim 10, wherein the revising of the possible change in position is further based on a determined change in orientation of the mobile device based on gyroscope sensor data.

12. The method of claim 1, wherein the one or more sensors of the mobile device include a magnetometer, and wherein the determining of the change in position is further based on dead reckoning based on magnetometer data.

13. The method of claim 1, wherein the heuristic map is periodically updated responsive to receiving new sets of sensor data from the one or more sensors of the mobile device with a periodicity of one second or less.

14. The method of claim 1, wherein the heuristic map is updated at the mobile device.

15. The method of claim 1, wherein the user interface has a plurality of visual indicators each indicating a corresponding possible current position from the set of current possible positions.

16. The method of claim 15, wherein the user interface indicates locations of one or more physical obstacles of the bounded area.

17. The method of claim 15, wherein the user interface indicates locations of one or more beacon nodes of the bounded area.

18. The method of claim 1, wherein the bounded area is an interior of a building or underground structure.

19. The method of claim 1, wherein the user interface is provided on an electronic display of the mobile device.

20. A method for tracking a mobile device in a bounded area, the method comprising:
   receiving, at a computer system, a first set of sensor data from one or more sensors of a mobile device;
   at the computer system, generating, based on the first set of sensor data, a heuristic map describing a set of possible current locations of the mobile device in a bounded area;
   receiving, at the computer system, a second set of sensor data from one or more sensors of the mobile device;
   determining, by a computer processor at the computer system, based on the second set of sensor data, a change in position of the mobile device;
   at the computer system, updating, based on the change in position, the heuristic map to disqualify a first possible current location from the set of possible current locations; and
   outputting the set of current possible locations of the heuristic map for display on a user interface of the mobile device,
   wherein determining the change in position of the mobile device comprises:
      determining, based on dead reckoning, a possible change in position of the mobile device; and
      revising, based on a relative comparison of received signal strength indicators at the mobile device, the possible change in position of the mobile device.

21. The method of claim 20, wherein the updating of the heuristic map further comprises updating, based on the change in position, the heuristic map to qualify a second possible current location for the set of possible current locations.

22. The method of claim 20, wherein the bounded area comprises one or more physical obstacles, and wherein the updating of the heuristic map to disqualify the first possible current location is further based on a location of a physical obstacle of the bounded area.

23. The method of claim 22, further comprising receiving location data for the one or more physical obstacles.

24. The method of claim 22, wherein the one or more physical obstacles is one or more of a physical structure or furniture.

25. The method of claim 20, wherein the one or more sensors of the mobile device include an accelerometer and/or gyroscope, and wherein the determining of the change in position comprises determining a change in orientation of the mobile device based on data from the accelerometer and/or gyroscope.

26. The method of claim 25, further comprising determining, based on the data from the accelerometer, whether the mobile device is stationary or transitory.

27. The method of claim 20, wherein the heuristic map further provides a set of possible next locations of the mobile device in the bounded area.

28. The method of claim 20, wherein the one or more sensors of the mobile device include a radio antenna, and wherein the determining of the change in position is further based on radio signals received at the radio antenna.

29. The method of claim 28, wherein the radio signals are received from beacon nodes of the bounded area.

30. The method of claim 28, further comprising determining received signal strength indicators of the radio signals.

31. The method of claim 20, wherein the revising of the possible change in position is further based on a determined change in orientation of the mobile device based on gyroscope sensor data.

32. The method of claim 20, wherein the one or more sensors of the mobile device include a magnetometer, and wherein the determining of the change in position is further based on dead reckoning based on magnetometer data.

33. The method of claim 20, wherein the heuristic map is periodically updated responsive to receiving new sets of sensor data from the one or more sensors of the mobile device with a periodicity of one second or less.

34. The method of claim 20, wherein the heuristic map is updated at the mobile device.

35. The method of claim 20, wherein the user interface has a plurality of visual indicators each indicating a corresponding possible current position from the set of current possible positions.

36. The method of claim 35, wherein the user interface indicates locations of one or more physical obstacles of the bounded area.

37. The method of claim 35, wherein the user interface indicates locations of one or more beacon nodes of the bounded area.

38. The method of claim 20, wherein the bounded area is an interior of a building or underground structure.

39. The method of claim 20, wherein the user interface is provided on an electronic display of the mobile device.

* * * * *